United States Patent [19]
Robinson et al.

[11] Patent Number: 5,546,632
[45] Date of Patent: Aug. 20, 1996

[54] SHEAR VISCOUS DAMPED HINGE

[75] Inventors: Anthony D. Robinson, Leesburg; Shawn T. Curtin, Manassas, both of Va.

[73] Assignee: Orbital Sciences Corporation, Dulles, Va.

[21] Appl. No.: 191,246

[22] Filed: Feb. 4, 1994

[51] Int. Cl.$^6$ ................................ E05F 1/08; E05F 3/14; E05F 5/02

[52] U.S. Cl. ................................ 16/54; 16/286; 16/277; 16/82

[58] Field of Search ................................ 16/49, 51, 52, 16/54, 61, 59, 73, 75, 82, 85, 286, 292, 297; 244/173; 343/881, DIG. 1, DIG. 2

[56] References Cited

U.S. PATENT DOCUMENTS

| | | | |
|---|---|---|---|
| 3,621,508 | 11/1971 | Di Noia et al. | 16/82 |
| 4,290,168 | 9/1981 | Binge | 16/271 |
| 4,426,752 | 1/1984 | Nakayama | 16/82 |
| 4,561,614 | 12/1985 | Olikara et al. | 244/173 |
| 4,694,530 | 9/1987 | Foggini | 16/82 |
| 4,773,242 | 9/1988 | Smith | 16/82 |
| 4,780,726 | 10/1988 | Archer et al. | 343/881 |
| 4,828,236 | 5/1989 | Inoue | 16/81 |
| 4,884,464 | 12/1989 | Grattarola et al. | 244/173 |
| 4,893,522 | 1/1990 | Arakawa | 16/82 |
| 5,083,343 | 1/1992 | Lee | 16/82 |
| 5,165,507 | 11/1992 | Ohshima | 16/82 |
| 5,356,095 | 10/1994 | Aker | 16/284 |
| 5,386,884 | 2/1995 | Chisholm | 16/277 |

OTHER PUBLICATIONS

Votta, "Constant–Force Springs," *Machine Design*, Jan. 31, 1963, pp. 102–106.

Primary Examiner—M. Rachuba
Assistant Examiner—Donald M. Gurley
Attorney, Agent, or Firm—Jenner & Block

[57] ABSTRACT

A shear viscous damped hinge uses a negator spring and a high viscosity fluid to provide a relatively slow and controlled deployment of the hinge. Shear damping of the fluid slows the angular velocity of the hinge. The invention reduces the end of travel impact loads thereby reducing the risk of damage to the hinge and the object rotated by the hinge. The hinge is particularly useful in, but not limited to, spacecraft applications.

20 Claims, 3 Drawing Sheets

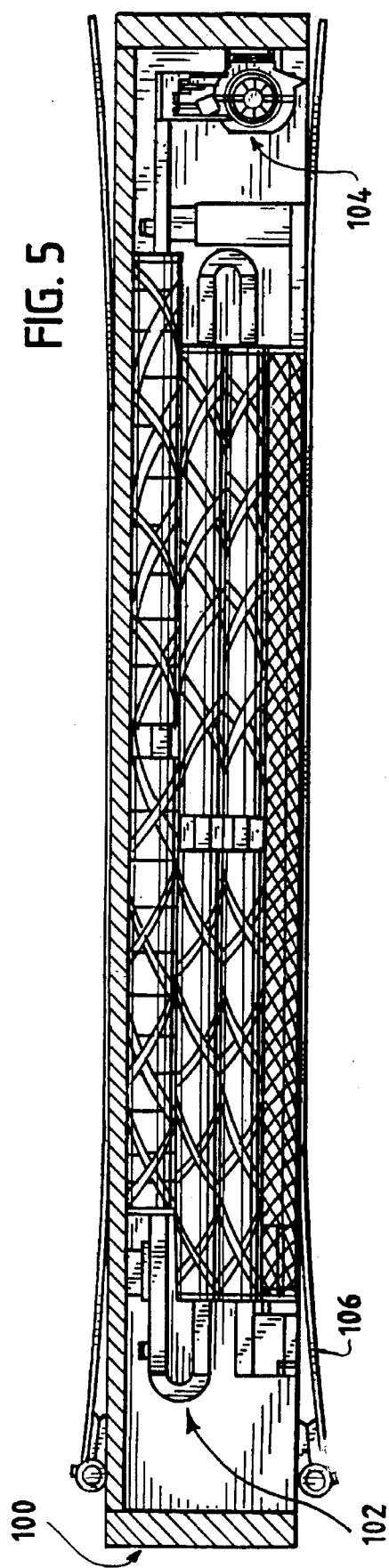
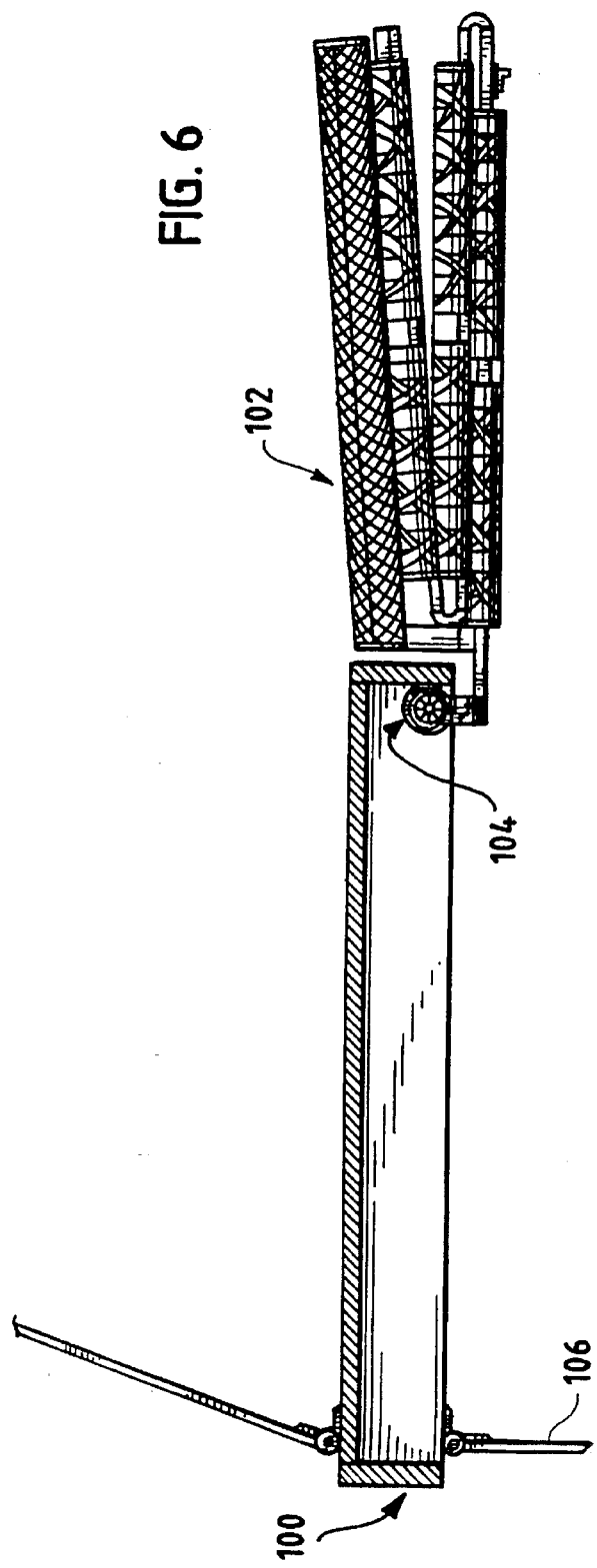

5,546,632

SHEAR VISCOUS DAMPED HINGE

BACKGROUND OF THE INVENTION

1. Field of the Invention

The invention relates to a hinge and more particularly, to a hinge utilizing a negator spring in combination with a high viscosity fluid that damps the hinge's rotation.

2. Description of the Related Art

In many applications, it is desirable to have a hinge capable of rotation through a predetermined angle. A negator spring can be used to supply a constant torque through this angle. While a negator spring can provide the needed torque to rotate the hinge through the predetermined angle, the angular velocity of the hinge can result in end of travel impact loads that may damage the hinge or the object which the hinge rotates. As a result, it is desirable to have a hinge capable of rotating through a predetermined angle but having a relatively slow rotation so as to reduce the end of travel impact loads.

OBJECT AND SUMMARY OF THE INVENTION

Therefore, it is a general object of the present invention to provide a hinge that is spring biased to rotate through a predetermined angle and that reduces the risk of damage to the object being carried by the hinge.

It is a more particular object to reduce the risk of damage to the object being carried by the hinge by reducing the end of travel impact on the hinge.

It is a still more particular object to provide a hinge having a reduced angular velocity.

The present invention accomplishes these objects using a negator spring in combination with a high viscosity damping fluid to provide shear damping. The hinge has essentially two positions—opened and closed—and briefly passes through intermediate positions.

The negator spring is attached at one end to an outer damper housing. The other end of the negator spring rests on a spring roller. The negator spring is long enough so that when the hinge is in its opened position, the negator spring loosely encircles the spring roller. When the spring roller is moved to place the hinge in its closed position, the spring is in tension tending to draw the hinge toward the opened position. The angular velocity of the hinge is controlled by controlling the angular velocity of the spring roller.

A heavy viscosity polysiloxane fluid slows or dampens the movement of the hinge between the closed and opened positions to protect the hinge and the object of movement from damage. The hinge includes an inner damper housing that rotates within the fixed outer damper housing. The high viscosity fluid is placed in a small annular gap between the inner damper housing and the outer damper housing. The relative rotation of the inner damper housing within the outer damper housing shears the fluid. The resulting shear damping slows the rotation of the inner damper housing within the outer damper housing and reduces end of travel impact.

A heater can be bonded to the outer damper housing to control the temperature of the fluid to allow the fluid to be sheared at the desired viscosity. Such a heater would be desirable, e.g., in some space missions using the hinge of the present invention.

BRIEF DESCRIPTION OF THE DRAWING

FIG. 5 is a sectional view of a satellite having a boom and antenna structure stowed therein and attached to a hinge constructed in accordance with the present invention and in the closed position; and FIG. 6 is a perspective view of a satellite after the satellite has deployed a boom and antenna structure using a hinge constructed in accordance with the present invention.

DETAILED DESCRIPTION OF THE PREFERRED EMBODIMENT

Figure 1:
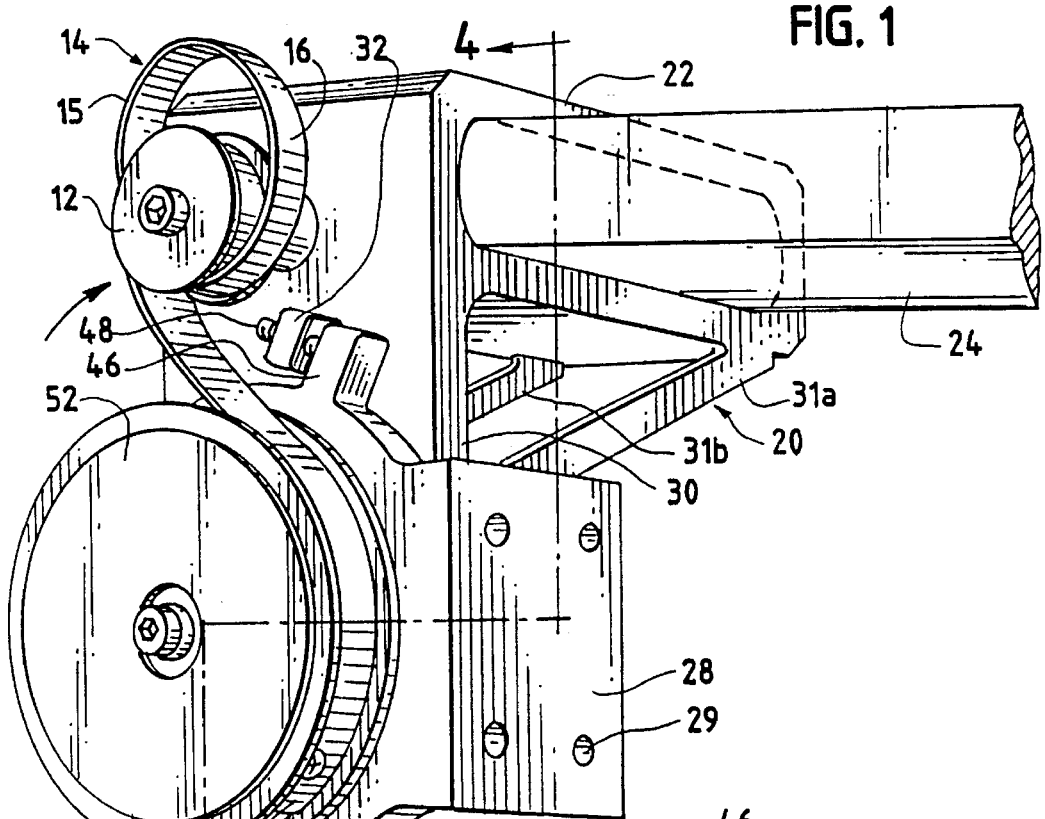
FIG. 1 is a perspective view of a hinge in accordance with the present invention shown in its opened position.

Referring to FIG. 1, a hinge includes an outer damper housing 10 and a spring roller 12. Spring roller 12 is capable of revolution about outer damper housing 10. A negator spring 14 made of, e.g., stainless steel, has one end 16 resting on spring roller 12. The opposite end 18 of negator spring 14 is attached to outer damper housing 10. Depending on the amount of torque required, negator spring 14 includes one or more stainless steel strips 15 that are slideable over one another. Negator spring 14 is substantially longer than the distance between its point of attachment to outer damper housing 10 and its point of contact with spring roller 12 when the hinge is in the opened position of FIG. 1.

Figure 3:
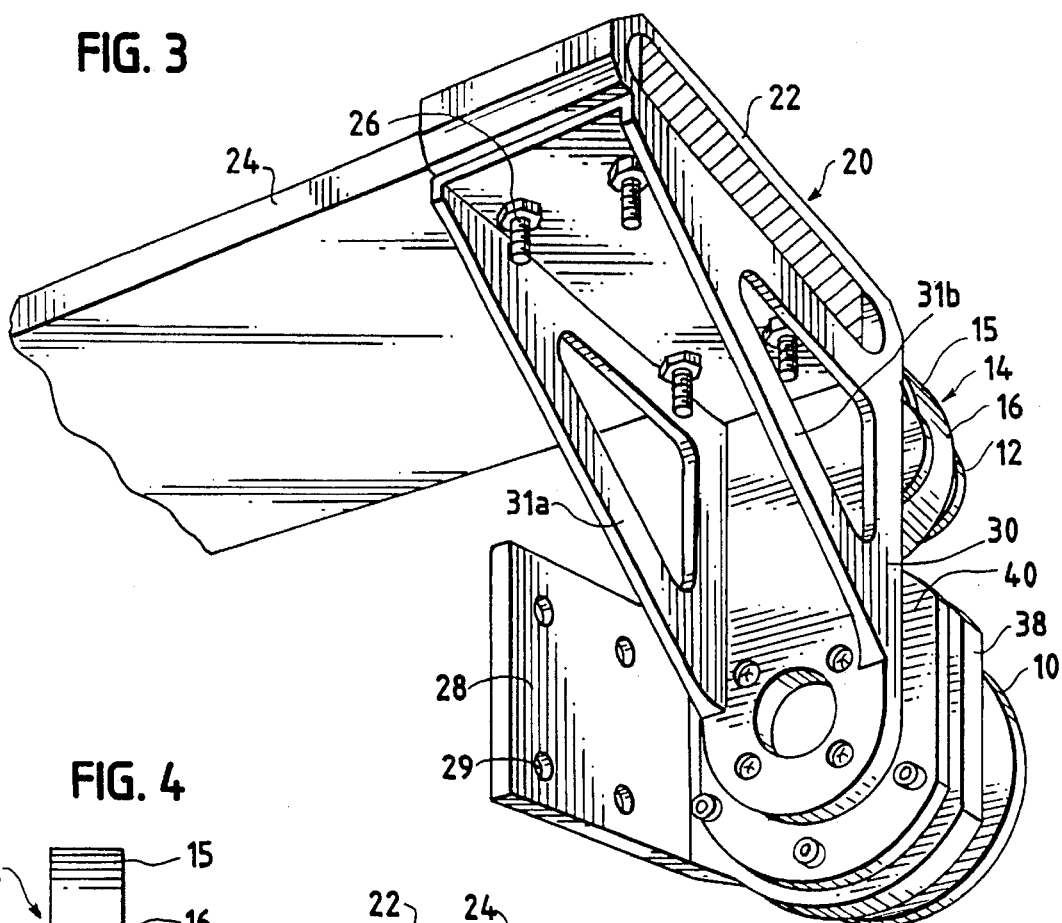
FIG. 3 is a rear perspective view of a hinge in accordance with the present invention shown in its opened position.

Spring roller 12 is attached to and moves with a hinge arm 20. Hinge arm 20 includes a receptacle 22 for receiving and holding an object, for example a boom 24, to be pivoted by the hinge. Boom 24 can be attached to hinge arm 20 via bolts 26, as shown in FIG. 3. It is to be understood that receptacle 22 could have many possible configurations other than that shown in FIG. 1 and could be adapted to attach objects other than a rectangular cross-sectional boom.

The hinge also includes a mounting base 28 for attaching the hinge to a desired surface with respect to which the hinge and attached object 24 pivot. Mounting base 28 can include a plurality of holes 29 to facilitate this mounting.

A shaft clevis 30 extends from receptacle 22 in a direction substantially perpendicular to receptacle 22. Supports 31a,b can be included between receptacle 22 and shaft clevis 30. A tab 32 extends outwardly from shaft clevis 30. Tab 32 helps to stop the hinge's rotation as will be more fully described below.

Figure 4:
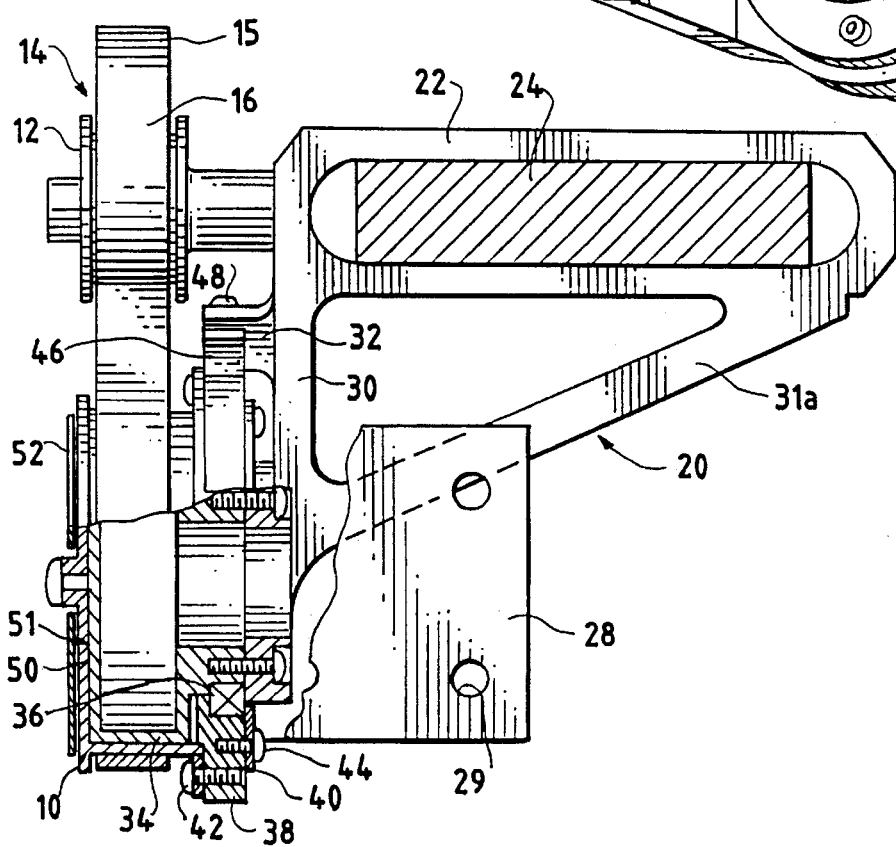
FIG. 4 is a partial cut away view of a hinge in accordance with the present invention shown in its opened position in the direction of line 4—4 in FIG. 1.

Referring to FIG. 4, it is shown that an inner damper housing 34 is disposed generally between shaft clevis 30 and outer damper housing 10. Inner damper housing 34 is rigidly attached to shaft clevis 30 so that inner damper housing 34 and shaft clevis 30 rotate together. An annular bearing 36 allows inner damper housing 34 to rotate within outer damper housing 10 which is fixed with respect to mounting base 28 and incapable of rotation.

A bearing clevis 38 holds bearing 36 in place. A bearing shield 40 maintains bearing clevis 38 and bearing 36 in place and provides a seal to prevent leakage of a high viscosity damping fluid 50 described below. Outer damper housing 10 can be bolted to bearing clevis 38 via a plurality of bolts 42. Similarly, bearing shield 40 can be bolted to bearing clevis 38 via bolts 44.

A tab stop 46 extends outwardly from a portion of the circumference of bearing clevis 38. Tab 32 is threaded to receive an adjustable screw 48. Adjustable screw 48 contacts tab stop 46 to terminate rotation of the hinge. Adjustment of adjustable screw 48 allows a precise stopping location to be chosen.

The hinge includes a small annular gap 51, e.g., 0.004", between outer damper housing 10 and inner damper housing 34. This size gap allows for adequate tolerancing for machinability while maintaining adequate damping. Gap 51 is filled with a heavy viscosity polysiloxane fluid 50, for example, McGhan Nusils CV7300 Silicone based fluid at 100,000 centistokes. This particular fluid also has low outgassing qualities to help maintain fluid 50 in gap 51 when the hinge is used in a space mission. A heater 52 can be provided on outer damper housing 10 to maintain the desired temperature of fluid 50 so that fluid 50 is sheared at the desired viscosity.

As inner damper housing 34 rotates within fixed outer damper housing 10, fluid 50 is sheared resulting in shear damping. This shear damping reduces the hinge's deployment rate and thereby reduces end of travel impact loading when tab 32 meets adjustable screw 48 of tab stop 46.

In the preferred embodiment, the hinge is constructed from Titanium 6A1-4V to provide stiffness when the hinge is used to deploy an antenna from a stowed position on a satellite as more fully described below.

Figure 2:
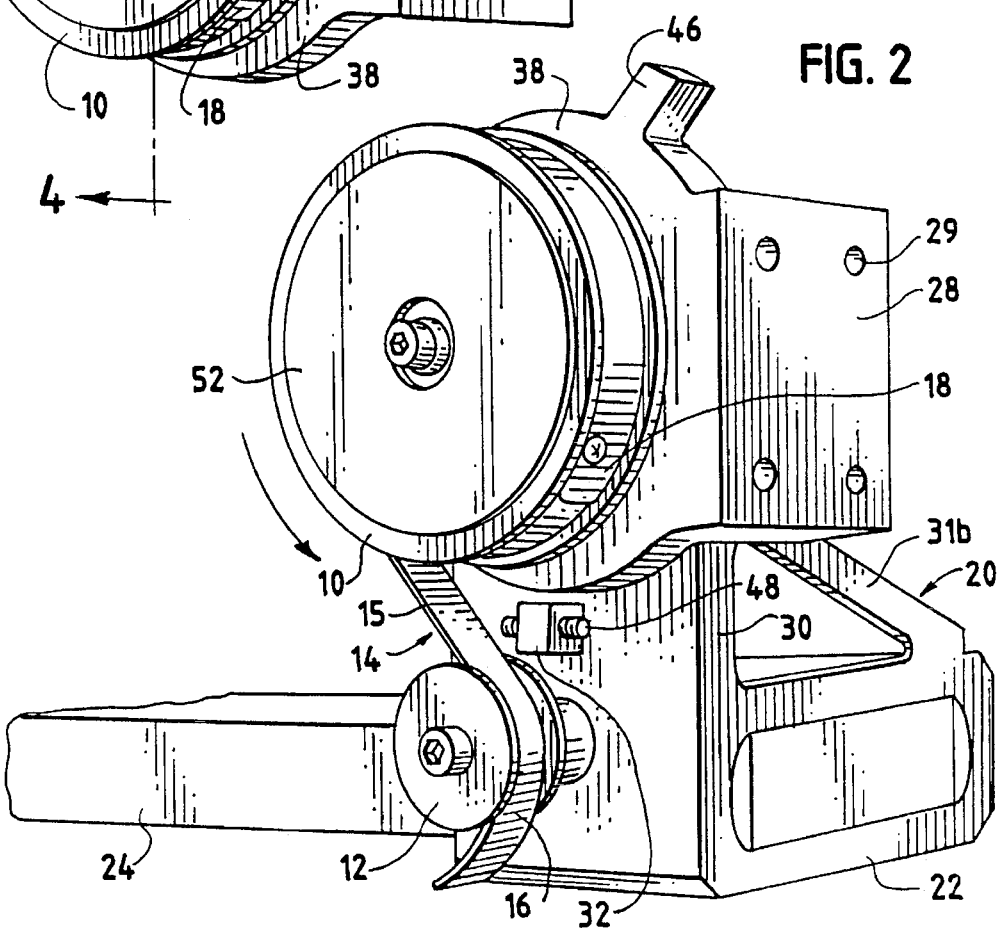
FIG. 2 is a perspective view of a hinge in accordance with the present invention shown in its closed position.

When it is desired to use the hinge to deploy an object such as boom 24, the hinge must first be placed into the closed position shown in FIG. 2. To place the hinge in its closed position, hinge arm 20 can be rotated with respect to outer damper housing 10, which causes negator spring 14 to be wound about the circumference of outer damper housing 10.

The energy used to deform negator spring 14 in the process of placing the hinge in its closed position is stored in negator spring 14. Spring roller 12 may be positioned, e.g., 180° from its location in the hinge's open position, if a 180° rotation of the hinge is desired at deployment. At this point, negator spring 14 is biasing spring roller 12 to return to its opened hinge location. Thus, means must be provided for maintaining spring roller 12 in this position until it is desired to operate the hinge.

For example, in FIG. 5, a satellite 100 is shown. A boom and antenna structure 102 is housed within satellite 100 and attached to a hinge 104 of the type of the present invention. Hinge 104 is a 180° hinge for deploying boom and antenna structure 102 so that it extends out of satellite 100. In FIG. 5, hinge 104 is in its closed position thereby urging boom and antenna structure 102 to rotate about hinge 104 to a position deployed from satellite 100. Prior to deployment, a solar array panel 106 maintains boom and antenna structure 102 in satellite 100 and prevents negator spring 14 from releasing its stored energy.

When it is desired to deploy boom and antenna structure 102, solar array panel 106 is opened, allowing boom and antenna structure 102 to pivot about hinge 104 to an open position, as shown in FIG. 6.

Referring again to FIG. 2, the biasing force of negator spring 14 causes spring roller 12 to revolve about outer damper housing 10 toward the opened hinge position of spring roller 12. Because hinge arm 20 is attached to spring roller 12, hinge arm 20 also rotates.

Shaft clevis 30 and inner damper housing 34 rotate along with hinge arm 20. Inner damper housing 34 is able to rotate within fixed outer damper housing 10 because of the presence of annular bearing 36. Fluid 50 is sheared as a result of the relative rotation of inner damper housing 34 with respect to outer damper housing 10. As mentioned above, the shearing of fluid 50 causes shear damping and reduces the rate of movement of hinge arm 20. Thus, a relatively slow and controlled deployment is provided. Such a deployment is desirable in that it reduces end of travel impact, thereby reducing the risk of damage to the hinge and to boom and antenna structure 102 or any other object being rotated by the hinge.

Hinge arm 20 continues to rotate until adjustable screw 48 contacts tab stop 46. Tab stop 46 prevents any further rotation of hinge arm 20 and positions hinge arm 20 at the desired deployed position as shown in FIG. 6.

Although the present invention has been described with respect to a boom of rectangular cross-section being deployed 180° from its stowed position in a satellite, it should be understood that each of these parameters is variable. For example, receptacle 22 can have any desired shape or configuration and the hinge can be used to rotate any desired angle through which negator spring 14 is capable of rotating. In order to facilitate a different degree of rotation, the length of negator spring 14 is modified accordingly.

Whereas the present invention has been described with respect to specific embodiments thereof, it will be understood that various changes and modifications will be suggested to one skilled in the art and it is intended that the invention encompass such changes and modifications as fall within the scope of the appended claims.

We claim:

1. A hinge, comprising:

an outer damper housing having a perimeter;

a spring roller mounted for revolution around the perimeter of said outer damper housing;

a negator spring having one end attached to said outer damper housing and the other end resting on said spring roller and biasing said roller for revolution around the perimeter of said outer damper housing;

a hinge arm fixedly attached to said spring roller;

an inner damper housing attached to said hinge arm, said inner damper housing being adapted for rotation with said hinge arm, said inner damper housing being rotatably connected within said outer damper housing; and a fluid disposed between said outer damper housing and said inner damper housing for shear damping rotation of said inner damper housing.

2. The hinge of claim 1 further comprising:

an annular bearing disposed about said inner damper housing; and an annular bearing clevis fixedly attached to said outer damper housing for holding said annular bearing in place.

3. The hinge of claim 2 wherein said hinge arm includes a tab and said bearing clevis includes a tab stop for engaging said tab.

4. The hinge of claim 3 wherein said tab stop includes adjustable means for controlling the location of engagement between said tab and said tab stop.

5. The hinge of claim 4 wherein said adjustable means comprises an adjustable screw.

6. The hinge of claim 1 wherein said hinge arm comprises:

a receptacle for fixed attachment of an object therein; and a shaft clevis integral to said receptacle and fixedly attached to said inner damper housing.

7. The hinge of claim 6 further comprising at least one support disposed between said receptacle and said shaft clevis.

8. The hinge of claim 6 wherein said receptacle is adapted for fixed attachment of a boom therein.

9. The hinge of claim 1 wherein said spring roller is adapted to be placed in an opened position and in a closed position around the perimeter of said outer damper housing.

10. The hinge of claim 9 wherein said opened position and said closed position are 180° apart.

11. The hinge of claim 1 further comprising a heater located on said outer damper housing.

12. The hinge of claim 1 wherein said fluid comprises a high viscosity polysiloxane fluid.

13. A hinge, comprising:

an outer damper housing having a perimeter;

a spring roller mounted for revolution around the perimeter of said outer damper housing;

a negator spring having two ends, wherein one end of said negator spring is attached to said outer damper housing and the other end of said negator spring rests on said spring roller;

an inner damper housing attached to said spring roller, said inner damper housing being rotatably connected within said outer damper housing; and a damping fluid disposed between said inner damper housing and said outer damper housing for shear damping rotation of said inner damper housing.

14. The hinge of claim 13 wherein said damping fluid comprises a polysiloxane fluid.

15. A hinge, comprising:

an outer damper housing having a perimeter;

a spring roller mounted for revolution around the perimeter of said outer damper housing;

a negator spring having two ends, wherein one end of said negator spring is attached to said outer damper housing and the other end of said negator spring rests on said spring roller;

an inner damper housing attached to said spring roller, said inner damper housing being rotatably connected within said outer damper housing; and a damping mechanism for damping movement of said inner damper housing with respect to said outer damper housing.

16. The hinge of claim 15 wherein said damping mechanism further comprises means for providing shear damping to damp movement of said inner damper housing.

17. A hinge, comprising:

a first damper housing having a perimeter;

a spring roller mounted for revolution around the perimeter of said first damper housing;

a negator spring having two ends, wherein one end of said negator spring is attached to said first damper housing and the other end of said negator spring rests on said spring roller;

a second damper housing attached to said spring roller, said second damper housing being moveable with respect to said first damper housing; and a damping fluid for damping movement of said second damper housing with respect to said first damper housing.

18. The hinge of claim 17 wherein said damping fluid is sheared to damp movement of said second damper housing.

19. A hinge, comprising:

a first damper housing having a perimeter;

a spring roller mounted for revolution around the perimeter of said first damper housing;

a negator spring having two ends, wherein one end of said negator spring is attached to said first damper housing and the other end of said negator spring rests on said spring roller;

a second damper housing attached to said spring roller, said second damper housing being moveable with respect to said first damper housing; and a damping mechanism for damping movement of said second damper housing with respect to said first damper housing.

20. The hinge of claim 19 wherein said damping mechanism further comprises means for providing shear damping to damp movement of said second damper housing.

\* \* \* \* \*